May 25, 1954

M. M. CANNON, JR 2,679,324

APPARATUS FOR AND METHOD OF FILLING
GLASS BATCH CHARGER HOPPERS

Filed Jan. 26, 1948

INVENTOR
MADISON M. CANNON JR.

BY Parham + Bates

ATTORNEYS

May 25, 1954

M. M. CANNON, JR 2,679,324

APPARATUS FOR AND METHOD OF FILLING
GLASS BATCH CHARGER HOPPERS

Filed Jan. 26, 1948

INVENTOR
MADISON M. CANNON JR.

BY Parham & Bates

ATTORNEYS

Patented May 25, 1954

2,679,324

UNITED STATES PATENT OFFICE 2,679,324

APPARATUS FOR AND METHOD OF FILLING GLASS BATCH CHARGER HOPPERS

Madison M. Cannon, Jr., West Hartford, Conn., assignor to Emhart Manufacturing Company, a corporation of Delaware Application January 26, 1948, Serial No. 4,224

2 Claims. (Cl. 214—17)

This invention relates to improvements in apparatus for and methods of supplying glass batch to glass batch charger hoppers.

A glass batch charger hopper is a receptacle which is open at its top and has a discharge opening in its bottom through which glass batch may descend into one or more batch chargers to replace batch fed therefrom into a glass melting tank that is being served by the charger or chargers. The batch charger hopper customarily is supplied with batch from a batch bucket which, after receiving its batch from a batch mixer, has been moved to a discharge position over the hopper. The discharge opening of the batch bucket is in its bottom and its cross section customarily is much smaller than that of the upper part of the hopper. Consequently, batch flow to such a hopper from a batch bucket heretofore has been attended by considerable de-mixing and segregation of relatively fine and coarser particles of the batch, the segregating action being roughly proportional to the lateral distance the batch moves in settling in the hopper. Such segregation tends to impair the quality of the glass melt produced therefrom in a melting tank. If the segregation is sufficiently extensive, the glass produced will not have the desired homogeneity.

An object of the invention is to prevent the segregation of fine and coarse particles of batch that heretofore normally has occurred when a batch hopper was filled by discharge from a batch bucket substantially as above described.

A further object of the invention is to supply glass batch to a batch charger hopper from a batch bucket in such a manner and by such means as to obviate any substantial lateral flow of the batch during or as an incident of its delivery to the hopper, whereby filling of the batch hopper may be effected without sufficient segregation of relatively fine and coarse particles of the batch to be significant in the glass melting operation.

Other objects and advantages of the invention hereinafter will be pointed out or will become obvious from the following description of a practical embodiment of the invention, as shown in the accompanying drawings, in which:

Fig. 1 is a plan view of a batch charger hopper and of a batch bucket carrier and rotator mounted thereon for horizontal movements above the hopper;

Fig. 2 is a side elevation of the hopper and of the batch bucket carrier and rotator mounted thereon, together with a batch bucket in operative position on the rotator, the view showing, in full lines and phantom lines, respectively, the batch bucket, its rotator and carrier at different places along their path of movements above the hopper during delivery of batch from the bucket to the hopper;

Figure 5:
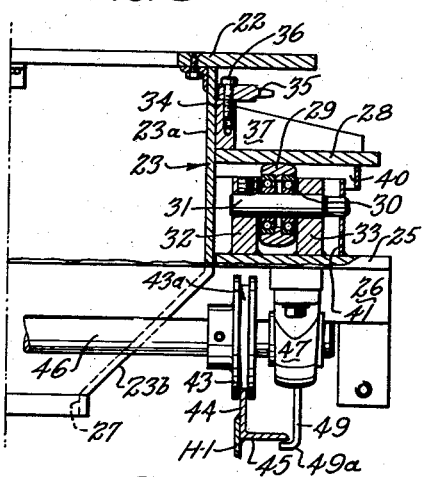
Figure 6:
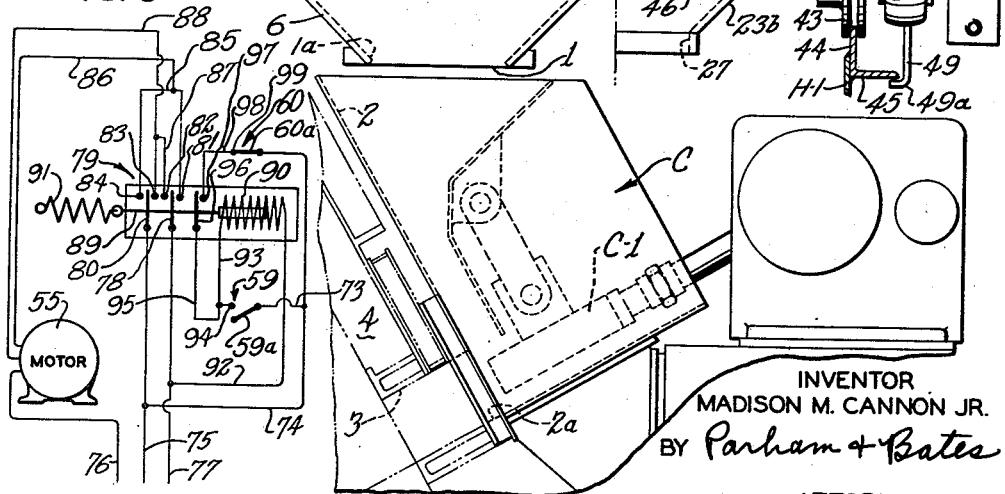

Fig. 5 is a fragmentary relatively enlarged vertical section substantially along the line 5—5 of Fig. 1, showing details of parts of the structural provisions for supporting the batch bucket rotator for rotation about its axis and for bodily movements on the hopper; and Fig. 6 is a diagram of an electric motor for driving the carrier for the batch bucket rotator back and forth on the hopper and of an electrical circuit and reversing provisions for the motor.

Figure 3:
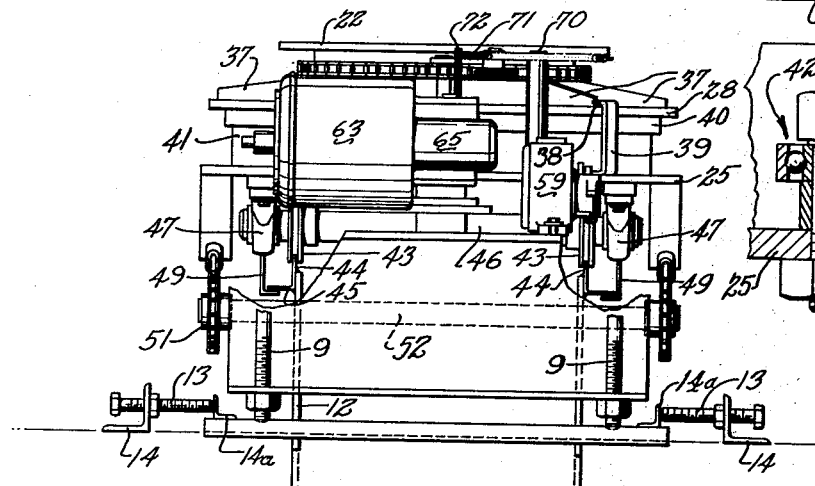
Fig. 3 is a relatively enlarged end view of the structure shown in Fig. 1, looking at the left hand thereof, with portions broken away to reveal parts that otherwise would be hidden, the view also showing more-or-less diagrammatically a batch charger in operative position beneath the hopper.

Referring now to the drawings, a batch charger hopper, generally designated H, Figs. 1, 2 and 3, is supported in an upright position, as by supporting means presently described, so that the bottom of the hopper, indicated at 1 in Fig. 3, is operatively positioned above the open upper end of a batch chamber 2 in a batch charger, generally designated C. The charger C is operatively positioned in relation to a charging opening 3 in a wall 4 which may be part of a wall of a glass melting tank or of a doghouse or other batch receiving extension of the melting tank proper. The charger chamber 2 has a lateral outlet 2a next to its bottom through which batch may pass directly into the charging opening 3. Movement of batch from the chamber 2 through the outlet 2a to the charging opening 3 may be regulated by a suitably operated movable batch feeding implement C-1.

The hopper H may be rectangular in cross section and is open at its upper end, designated 5, as best seen in Fig. 1. It comprises a pair of side walls H-1 and end walls H-2 fastened or joined together in any suitable known manner, as by welding. The side walls H-1 may be vertical from their upper edges for most of their height, the extreme lower portions thereof, indicated at 6, Fig. 3, being inwardly inclined or convergent so as substantially to reduce the width of the lower end of the hopper and to provide partial support at the bottom of the hopper for the large mass of batch which in actual practice will fill the hopper from its lower end for at least a substantial part of its height. A bottom discharge opening, designated 1-a, having a width substantially less than the opening at the top of the hopper is thus provided for downward flow of batch from the supply body in the hopper into the underneath batch charger chamber 2. The hopper walls may be braced and reenforced at suitable places in any suitable known manner by any suitable known means. In carrying out the present invention, the hopper may be braced internally by transverse vertical partitions H-3, thus providing a series of similar vertical sections or compartments H-4, each extending from the bottom of the hopper for a substantial part of the full height thereof but below the level of the batch in the hopper when the latter is in use and is being supplied with batch as hereinafter explained. Each hopper section H-4 thus has its own discharge opening at the bottom of the hopper.

The hopper is supported in the example shown on a pair of stationary, horizontally spaced, parallel beams 7, Fig. 2. These are located outwardly from the opposite ends of the hopper and carry longitudinally adjustable strips 8. Jack screws 9 are threaded through out-turned flanges of edgewise disposed horizontal channels 10 and rest upon the plates 8, there being one of these channels and two of the jack screws located outwardly from each end of the hopper at about the level of the upper portion thereof. Projecting from the webs of the channels 10 toward the adjacent corner portions of the hopper are pairs of edgewise disposed relatively thick and wide supporting bars 11 which are rigid with the channels 10, as by being welded thereto. The pairs of supporting members 11 are straddled by edgewise disposed attaching plates 12 which project from the opposite ends of the upper part of the hopper H as rigid or integral extensions of upper portions of the hopper side walls. The plates 12 may be fastened rigidly to the supporting members 11, as by being welded thereto, whereby the hopper will be supported on the beams 7 in a predetermined position. This position may be adjusted vertically within limits by adjustment of the jack screws 9 and may be adjusted laterally by adjusting the supporting strips 8 longitudinally on the heads of the beams 7, as by adjustment of opposed horizontal adjusting screws 13, Fig. 3, these being threaded through fixed supports 14 at opposite ends of each of the supporting strips 8 so as to bear against abutment elements 14a which are fixed on the supporting strip 8 adjacent to its opposite ends. By the supporting structure described, the lower end of the hopper may be positioned properly for discharge of batch into an underneath batch charger or row of batch chargers. While only one batch charger is shown, it will be understood that the batch charger C and its chamber 2, as shown, may in actual practice comprise a plurality of separate chargers and charger chambers.

A batch bucket, designated 15, Fig. 2, may be generally of conventional form and construction and includes a downwardly tapering or frustoconical lower end portion 15a and a bottom 15b, the central portion of which is formed to define a discharge orifice 16. This discharge orifice is open for downward discharge of batch from the batch bucket, as shown in Fig. 2, when a valve or stopper member 17 has been lowered from a seated position in the orifice. The member 17 is carried by a vertical stem 18 which extends upwardly through the discharge orifice 16 and the batch bucket to and through a suitable opening 19 in a fixed bale or guide member 20 on the top of the batch bucket 15, the upper end of the stem 18 projecting above the member 19 and being provided with a transverse hole 21 with which a hook of a hoist or the like (not shown) may be engaged to raise the valve or stopper 17 to its closed position and to keep it raised during movement of the bucket from a place at which it was filled with batch from a batch mixer to a position at which discharge of batch from the bucket is to be effected.

In the example shown, the discharge position of the batch bucket is over the hopper H and the bottom of the batch bucket rests upon an externally flanged upper end portion 22 of a vertically disposed rotator funnel 23 which depends through a central opening 24 in a horizontally disposed body 25 of a carriage, generally designated 26, the rotator funnel 23 being mounted on the carriage body 25 by means presently to be described so that the smaller discharge end of the funnel, which is formed to define an axial discharge orifice, indicated at 27, is positioned in alignment with the discharge orifice 16 of the batch bucket and in a desirable discharge position in relation to the charger hopper H. The lower discharge end portion of the rotator funnel 23 is well below the plane of the upper edge of the hopper when in the discharge position illustrated in Fig. 2 but might be at a slightly higher or lower level. The rotator funnel is in effect a downward continuation of the discharge bucket and the funnel discharge opening 27 may be approximately like the discharge orifice 16 in the bottom of the batch bucket so far as cross-sectional area and configuration are concerned. Like the batch bucket, the funnel 23 may be formed so that its side wall is vertical, as indicated at 23a, Figs. 2 and 5, such side wall then being downwardly tapering or frusto-conical, as indicated at 23b, for the remainder of its height, down to the extreme lower end portion thereof which defines the discharge opening 27.

The lower end portion of the rotator funnel may be positioned midway between the side walls of the hopper when the funnel and the batch bucket thereon are to be moved bodily only in the direction of length of the hopper H, as in the example shown. This position of the lower end of the funnel is suitable since the diameter of the discharge opening 27 in the lower end of the funnel is not sufficiently less than the transverse dimension of the upper end of the space within the hopper to permit transverse lateral flow of the batch discharging therefrom into the hopper to an extent that would be harmful in the melting of glass from such batch.

In mounting the funnel 23 on the carriage body 25, the upright, substantially cylindrical portion 23a of the funnel wall may be provided with an external supporting flange 28 resting upon rollers 29 which are provided at intervals around the vertical axis of the funnel, as shown by Fig. 1. Each of the rollers 29 is mounted, preferably antifrictionally, as indicated at 30, Fig. 5, upon a radially disposed axle or short shaft 31 which is supported by suitable radially spaced fixed supporting members 32 and 33, respectively, on the carriage body 25. The supporting flange 28 on the rotator funnel may be made fast to the latter in any suitable known manner. It is shown in Fig. 5 as being located directly beneath the lower edge of a ring 34 which also is mounted on the substantially cylindrical portion 23a of the funnel body and may be made fast to the latter in any suitable known manner, the ring 34 carrying an annular or ring sprocket 35 which is fastened thereto by suitable means, as by cap bolts such as that indicated at 36. The weight to be carried by the flange 28 is, of course, substantial and this flange may be strongly braced or stayed to the funnel body. In the structure shown, radial brace members 37 are provided on the top of the flange 28 between such flange and the ring 34 at intervals around the axis of the rotator funnel as indicated by the showing of Fig. 1. The radial braces 37 terminate at their outer ends short of the periphery of the flange 28 so as to afford clearance for inwardly turned upper end portions 38 of upright hold on members 39, which are fixed on the carriage body 25 at intervals around the rotator funnel so as to prevent any harmful accidental or unintended upward displacement of the funnel from the supporting rollers 29. The flange 28 also may carry a depending annular skirt 40 which depends into overlapping relation with an annular ring 41 on the carriage body 25, these two members serving as a dust guard or shield.

Figure 4:
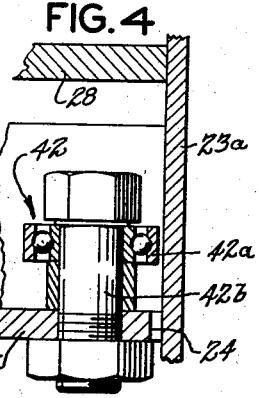
Fig. 4 is a relatively enlarged, fragmentary, vertical section along the line 4—4 of Fig. 1, showing one of a plurality of cooperative elements for limiting lateral shifting movements of the batch bucket rotator on its carrier.

Any substantial lateral displacement of the rotator funnel and of the bucket carried thereby may be prevented by angularly spaced stop elements, generally designated 42, positioned on the carriage body 25 at a suitable radial distance at the axis of the funnel to be contacted by the portion 23a thereof on a slight horizontal movement of the funnel before the funnel contacts the wall of the opening 24 in the carriage body. The details of each of the elements 42 may be as shown in Fig. 4, the contact member thereof being an antifrictionally mounted, horizontally disposed roller 42a carried on a vertically disposed stem 42b fixed to the carriage body 25.

The carriage body is mounted on traction wheels 43 which are adapted to run upon rails 44 on the sides of the upper portion of the hopper H. The rails 44 may be upturned legs of angle irons, designated 45, which may be fastened, as by welding, to the sides H-1 of the hopper H so that the rail forming legs thereof project above the upper edge of the hopper. These rails may extend beyond the ends of the hopper and be fastened to the attaching plates 12 so as to reinforce the connection of the latter with the hopper as a whole. The wheels 43 may have their peripheries grooved, as indicated at 43a, Fig. 5, so as to engage with the upper edge portion of the rails to prevent lateral displacement of the wheels from such rails. As shown, the wheels 43 are carried by axles 46 which extend transversely of the carriage body 25 near the opposite ends thereof and are appropriately suspended from the latter, as by journal boxes, such as indicated at 47, Fig. 5; the carriage thus is supported in a stable manner on the rails 44. As a safety factor to prevent accidental or unintended upward displacement of the carriage from these rails, hold down hooks, such as indicated at 49 in Fig. 5, may depend from the carriage body 25 and be provided with an inturned lower end portion 49a underlying a portion of each of the rail members 45.

To move the carriage and the parts thereon back and forth on the hopper, chains 50 may be trained about sprockets 51 on transverse shafts 52 provided on the hopper supporting structure, one end of each of these chains being attached adjustably, as by a turn buckle 53, to the forward end of the carriage and the other end of such chain being attached similarly as at 54 to the rearward end of the carriage. A motor, indicated at 55, is shown as supported on a bracket 56 on one end of the hopper and has a driving connection through a conventional speed reduction unit, indicated at 57, Fig. 2, and a sprocket and chain arrangement, indicated at 58, with one of the shafts 52 carrying the sprockets 51 at the adjacent end of the structure. The motor 55 is of a reversible type and when operating in one direction will move the carriage and the parts shown thereon from the full-line position of Fig. 2 to and past the dotted-line position of the same view. On reversal of the motor, the carriage and the parts thereon will be returned to the full-line position. To reverse the carriage at each end of its path of movements, limit switches, designated 59 and 60, respectively, are provided at opposite ends of the supporting structure in positions to be engaged by actuators 61 and 62, respectively, on the opposite ends of the carriage. The operation of these parts and of associate electrical circuit forming means will hereinafter be described.

In moving along the top of the hopper, batch will descend from the discharge opening 27 of the rotator funnel into the hopper to fill the latter to the bottom edge of the discharge end of the rotator funnel and, in use, to keep the hopper filled to this approximate level. Since the transverse dimension or diameter of the effective discharge orifice of the batch bucket, which is the discharge opening 27 of the intervening rotator funnel, is only slightly less than the internal width of the hopper, the hopper may be filled without sufficient lateral flow of the batch as it settles therein to produce harmful segregation. There may be a slight variation of the batch level longitudinally of the hopper by reason of the traversing movements of the batch supply means.

Rotation of the batch bucket and the hopper funnel as a unit is employed to nullify such segregation by grain size of the constituents deposited in the bucket that usually exists therein. Such rotation is effected in the illustrated embodiment of the invention by a mechanism comprising a motor 63 driving a small sprocket wheel 64 through a speed reduction unit 65, the small sprocket 64 in turn driving a chain 66 which is trained about and drives the relatively large ring sprocket 35 on the rotator funnel 23. The motor 63, the connected speed reduction unit 65 and the connected small sprocket 64 may all be supported, as by a bracket 67 on the carriage body 25. The chain 66 may be kept desirably taut by a chain tightener comprising a free sprocket 68 on one end of a bell crank lever 69, mounted on a vertical shaft 70 on the carriage body 25, the opposite end of the bell crank lever being connected by a tension coil spring 71 to a fixed anchoring post 72 on the speed reduction unit 65 so as yieldingly to urge the tightener sprocket 68 against the chain 66 to maintain the latter desirably taut.

To reverse the carriage at opposite ends of its horizontally reciprocatory movements along the top of the charger hopper, a suitable motor operating electrical mechanism of any suitable known or preferred conventional construction may be provided in conjunction with the limit switches 59 and 60 and the carriage actuators 61 and 62. One such mechanism is shown diagrammatically in Fig. 6. One of the limit switches, as the switch 59, is normally open while the other switch, i. e., the switch 60, is normally closed. The switch 59 includes an operating handle or movable switch closing element 59a adapted to be struck by the actuator 61 when the carriage has reached the limit of its horizontal movement to the left, as viewed in Figs. 1 and 2, whereby to close the switch 59. The normally closed switch 60 likewise has an operating handle or movable switch opening element 60a adapted to be struck and moved by the actuator 62 as the carriage moves to the limit of its movement to the right as viewed in Figs. 1 and 2, whereby to open the switch 60. The movable switch closing element 59a of the switch 59 is shown in Fig. 6 as connected by a wire 73 with a wire 74 which is connected at one end with the movable switch opening element 60a of the normally closed switch 60 and at its opposite end to a lead wire 75 of a three-wire, tri-phase alternating current system. Another lead wire, designated 76, of this alternating current supply system leads directly to the motor 55. The third lead wire, designated 77, of such system is connected to a movable switch arm 78 of a reversing switch mechanism, generally designated 79, which comprises a second movable switch arm 80 with which the lead wire 75 is connected. The movable switch arm 78 has an oscillatory operating movement between two spaced contacts 81 and 82, respectively. Similarly, the switch arm 80 is movable between spaced contacts 83 and 84, respectively, into contact with one or the other of them. The contacts 81 and 84, which are the farthest apart of the two sets of switch contacts just mentioned, are operatively connected together by a conductor 85 which is connected by a conductor 86 operatively to the motor 55. The two relatively adjacent contacts 83 and 82 likewise are electrically connected to each other by a wire 87 which is electrically connected by a wire 88 to the motor 55, the wires 86 and 88 together with the directly connected supply wire 76 constituting a conventional three-wire system for supplying tri-phase alternating current to the motor 55. The switch arms 78 and 80 are connected to move in unison by a plunger 89 of a solenoid 90, this plunger being urged by a tension spring 91 in a direction to move the switch arm 80 against the contact 84 and the switch arm 78 against the contact 82 when the solenoid is de-energized. On energization of the solenoid, the plunger will be retracted against the action of the spring 91 so as to move the switch arm 78 against the contact 81 and the switch arm 80 against the contact 83. When the switch arms 80 and 78 are against the contacts 84 and 82, respectively, the motor will be operated in one direction. When the switch arms 80 and 78 are in contact with the contacts 83 and 81, respectively, the motor 55 will be operated so as to drive in the opposite direction. The limit switches 59 and 60 are included in a combined solenoid energizing and holding circuit. This comprises a wire 92 operatively connecting one side of the solenoid 90 with the lead wire 77; a wire 93 operatively connects the other side of the solenoid with a contact 94 with which the movable element 59a of the normally open switch 59 cooperates. A wire 95 operatively connects the contact 94 with a movable switch arm 96 which is connected to be operated by the solenoid plunger 89 in unison with the movable switch arms 78 and 80. However, the switch arm 96 is a single-throw switch and cooperates only with a single contact, indicated at 97. This contact is operatively connected by a wire 98 with a contact 99 of the normally closed switch 60, the contact 99 being adapted for cooperation with the movable switch arm 60a of such normally closed switch.

The operation of the electrical circuit forming and motor energizing mechanism will be readily understood. Assuming a movement of the carriage and the parts thereon to the left, as viewed in Figs. 1 and 2, and a closing of the normally open switch 59 by the contact of the actuator 61 with the movable element 59a of that switch at the conclusion of the indicated movement of the carriage, it is clear that the solenoid will be energized momentarily by the closing of the switch 59 so as to retract the solenoid plunger 89, thereby moving the switch arm 80 against the contact 83, the switch arm 78 against the contact 81 and the switch arm 96 against the contact 97. This will effect reversal of the motor 55 so as to start the carriage back on a movement to the right, as viewed in Figs. 1 and 2. The switch 59 will open but, since the switch comprising the movable switch arm 96 and the contact 97 has been closed, a solenoid circuit will still be closed and the solenoid plunger will be kept retracted until the carriage reaches the end of its movement to the right. At that time, the solenoid circuit will be broken by the opening of the normally closed switch 60 by the contact of the actuator 62 with the movable switch opening element 60a. Both switches 59 and 60 will then be open and the spring 91 will be effective to move the solenoid plunger 89 outward, thereby causing movement of the switch arm 80 against the contact 84, movement of the switch arm 78 against the contact 82 and movement of the switch arm 96 away from the contact 97. The motor 55 will now be operated to drive the carriage to the left and this operation will continue until the actuator 61 again strikes the switch element 59a and closes this normally open switch.

Batch level in hopper will always rise to bottom of rotating funnel at a point circumscribed by the periphery of the funnel orifice. This high point in the batch level will travel back and forth with the funnel. The level at all other points in the path of travel of the funnel will be governed by the rate of discharge from the charger and the time it takes for the carriage to traverse back to each such point after having once been there. As soon as it gets back the original level will be restored. The carriage speed is such that even at maximum charging rates the batch level at the extreme ends of the hopper will only have fallen about 1½" before it is restored by the return of the carriage. In Fig. 2, the batch level is indicated at 100. The delivery of batch from the batch bucket to the hopper has been effected without sufficient lateral flow of the deposited batch to permit sufficient segregation to impair the quality of the glass made from such batch.

The feature of rotating the batch bucket to nullify "parallel" segregation that usually exists in the batch bucket is also disclosed and claimed in my earlier filed, co-pending application, Serial No. 661,759, filed April 12, 1946, now Patent 2,593,535, for "Method and Apparatus for Handling Glass Batch." No claim is made herein for this feature, per se.

The details of the illustrative embodiment of the invention shown in the accompanying drawings and herein particularly described may be varied and modified in various ways which now will be obvious to or will readily occur to those skilled in the art and I, therefore, do not wish to be limited to such details.

I claim:

1. In glass batch delivery apparatus, an upright hopper of substantially rectangular configuration at its top, said top being open, a track comprising rails on the sides of the hopper at the top thereof, a carriage mounted for movement on said rails, said carriage having a central opening located directly over the top of the hopper, a funnel rotatably mounted on said carriage so as to depend through said opening of the carriage and having a discharge opening at its lower end positioned above the hopper approximately intermediate the sides thereof, a batch bucket having a discharge orifice at its bottom, said batch bucket resting upon the top of said funnel so as to rotate with the latter, means movable with said carriage to impart rotation to said funnel, and means operatively connected with said carriage to move it back and forth on said rails.

2. A method of filling a batch hopper which is open and of substantially rectangular configuration at its top by discharge from a batch bucket having a discharge orifice slightly smaller in diameter than the minor horizontal dimension of the hopper and many times smaller than the major horizontal dimension of the hopper, which comprises positioning said batch bucket over the hopper with its discharge orifice in operative discharge position in relation to the hopper, moving said batch bucket horizontally back and forth above the hopper in the direction of said major axis of the hopper while maintaining the orifice of the batch bucket continuously in an operative discharge position in relation to said hopper, and rotating said batch bucket about the axis of its discharge orifice concurrently with said horizontal movements of the batch bucket above the hopper.

References Cited in the file of this patent

UNITED STATES PATENTS

| Number | Name | Date |
|---|---|---|
| 522,705 | Chandler | July 10, 1894 |
| 910,233 | Roberts | Jan. 19, 1909 |
| 1,824,483 | Hubmann et al. | Sept. 22, 1931 |
| 1,864,711 | Buettell | June 28, 1932 |
| 2,219,226 | Gerber | Oct. 22, 1940 |
| 2,238,200 | Willeke | Apr. 15, 1941 |
| 2,306,510 | Trickey | Dec. 29, 1942 |
| 2,420,653 | Clark | May 20, 1947 |

FOREIGN PATENTS

| Number | Country | Date |
|---|---|---|
| 648,204 | Germany | July 24, 1937 |